H. J. BLAKESLEE.
METER TESTING APPARATUS.
APPLICATION FILED NOV. 2, 1916.
1,309,931.
Patented July 15, 1919.
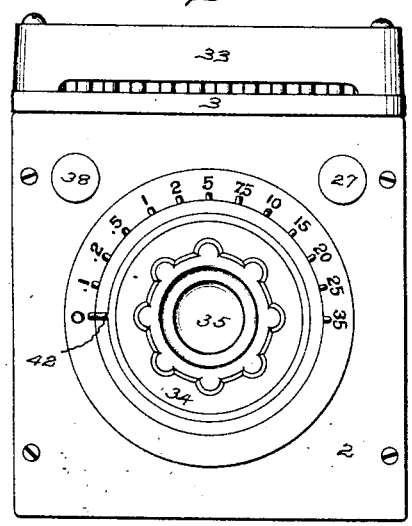
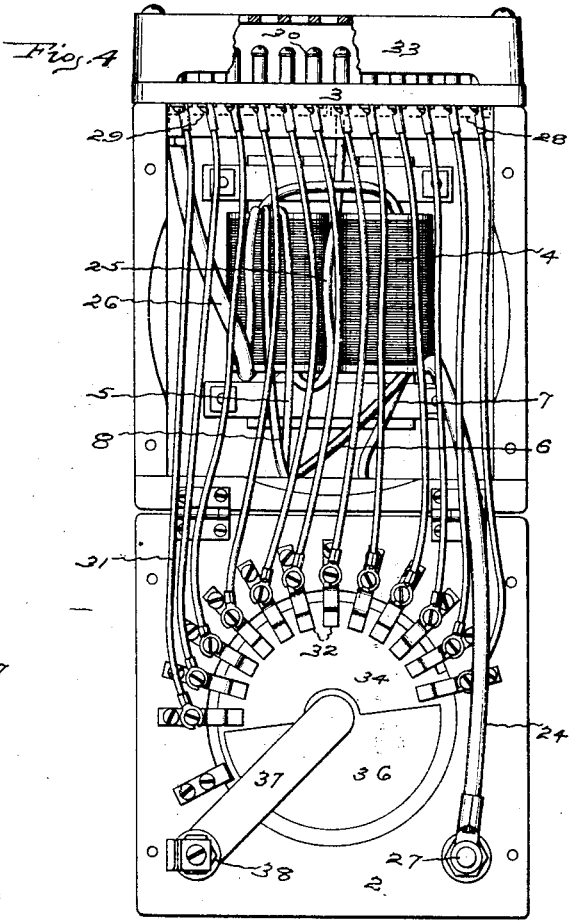
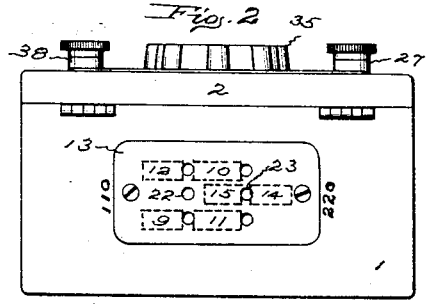
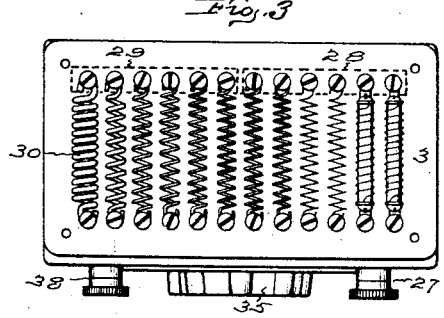
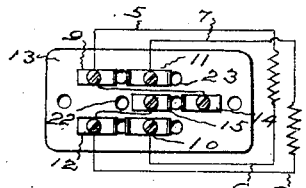
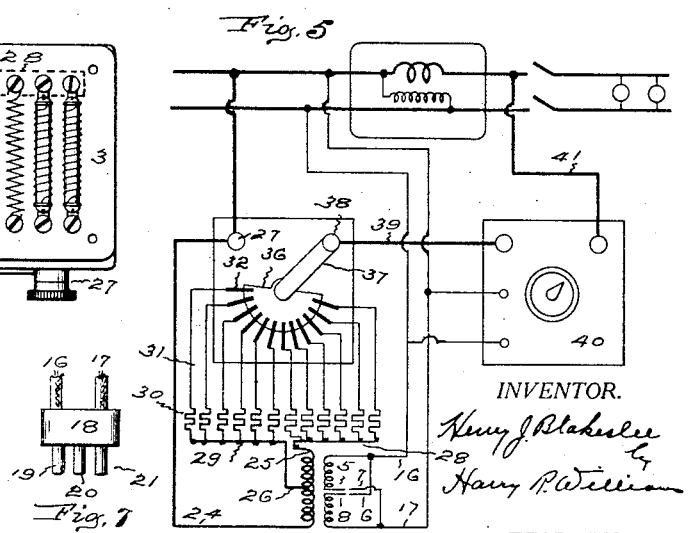
INVENTOR.
Henry J. Blakeslee
by
Harry P. Williams
ATTORNEY.

UNITED STATES PATENT OFFICE.

HENRY J. BLAKESLEE, OF WEST HARTFORD, CONNECTICUT.

METER-TESTING APPARATUS.

1,309,931.  Specification of Letters Patent.  Patented July 15, 1919.

Application filed November 2, 1916. Serial No. 129,171.

*To all whom it may concern:*

Be it known that I, HENRY J. BLAKESLEE, a citizen of the United States, residing at West Hartford, in the county of Hartford and State of Connecticut, have invented a new and useful Improvement in Meter-Testing Apparatus, of which the following is a specification.

This invention relates to an apparatus for controlling the current used in testing watt-hour electric meters, and particularly when such current is taken from a low voltage coil of a transformer.

The object of the invention is to provide a portable load box which is small, light, easily adjusted, non-inductive and economical of energy, and which has closely fixed load steps so proportioned and connected that very accurate tests may be quickly made of meters of various ratings.

An appreciable E. M. F. is required to force current through the series coil of a watt-hour meter, and in commercial meters the E. M. F. required in the series coils is greater for meters of small current rating than for meters of large current rating. Therefore in an artificial load which is intended to furnish fixed current steps, the closeness with which such steps are fixed will depend upon the relation which the E. M. F. used in the series coils bears to the total E. M. F. employed. For instance, if a 2 volt source were used, with a given resistance in the circuit external to the meter, a much greater current would flow through a 50 amp. than through a 5 amp. meter. If a 100 volt source were used and the resistance of the external circuit were kept constant there would be a very small variation in the amount of current which would flow through different size meters. In other words, in order to keep the current fixed in a circuit of constant E. M. F. the impedance must remain constant. As the impedance in meters of different ratings varies it is necessary to use considerable external resistance in order that the total impedance of the circuit may differ but slightly as various size meters are tested. The greater the impedance of the circuit the greater E. M. F. required for a given current, consequently the greater the degree of constancy in current steps desired the greater the E. M. F. required. Increase in E. M. F. necessarily results in larger and heavier transformer, resistances, etc. The constancy of steps can only be improved by an increase in size and weight; size and weight can only be decreased by making the steps more unstable. A considerable portion of the impedance in the test circuit of a meter exists in the winding of the transformer and in the leads. If the resistances are arranged selectively, that is, each to give an approximately fixed step, and when combined to give current equal to the sum of the individual steps, then the transformer must be of liberal design with good regulation and consequent large size and weight, and the leads must be large to prevent increase in drop in voltage in the circuit through the load box as the amount of current taken from the transformer is increased.

If, however, the resistances are not combined selectively, but cumulatively, then each step may be adjusted by adding resistances in multiple with that used in the next lower step, and the regulation of the transformer need not be close and the size of the leads may be small without detriment to the operation of the apparatus, but with great saving in size and weight. This invention involving the above problems attains this end.

In the accompanying drawings Figure 1 shows a front view of a phantom load box which is particularly designed for use in testing alternating current watt-hour meters by the rotating-standard test-meter method. Fig. 2 shows a view of the bottom edge of the same. Fig. 3 is a view of the top edge with the shell that is placed over the resistance coils omitted. Fig. 4 shows the box with the cover opened so as to expose the interior. Fig. 5 is a diagrammatic illustration showing the connections when making a test of a service meter with this particular type of apparatus. Fig. 6 is a view of the plug connection block with the primary terminal contacts for the potential terminal plug. Fig. 7 is a view of the potential terminal plug.

The case 1 is shown as made of wood with a cover 2 of suitable electrical insulation hinged to the front and an insulating block 3 of high heat endurance fastened to the top.

In the case is a two-spool transformer 4. The primary of the transformer is desirably wound in two coils having leads 5, 6, 7 and 8 that are connected with contacts 9, 10, 11 and 12 on the inside of the insulating block 13 that is set into the bottom of the box. The contact 9 is connected with a contact 14 and the contact 12 is connected with a contact 15. The potential leads 16 and 17 are connected with a plug 18 that has three conducting studs 19, 20 and 21. When the current is to be tapped from a 110 volt line the studs of this plug are inserted through the perforations 22 in the block 13. This connects the contacts so that the primary coils are in multiple. When the current is to be tapped from a 220 volt line the studs are inserted through the perforations 23, which connects the contacts in such manner that the primary coils will be in series.

The low voltage secondary, from which the testing current is taken, has leads 24, 25 and 26, the lead 24 connecting one end of the secondary with the binding post 27 on the cover to which one side of the current coil of the meter is connected, the lead 25 connecting the other end of the secondary with the bus-bar 28 on the inside of the insulating block 3 at the top, and the lead 26 connecting the middle of the secondary with the bus-bar 29 on the inside of the insulating block. The secondary is wound so as to give a 5 volt pressure between the lead 24 and the bus-bar 29 through the lead 26 and a 10 volt pressure between the lead 24 and the bus-bar 28 through the lead 25. When testing with the particular box shown, the load current up to and including 5 amperes, is taken from the 10 volt bus-bar, and for loads above 5 amperes the current is taken from the 5 volt bus bar. This is done to make the small load steps dependable because the potential drop through the current coil of a small capacity service meter and a standard test meter is much greater than in the same combination of large size.

The various load steps are fixed by means of resistance coils 30 which are of various capacities and which are mounted on the outside of the block 3 at the top of the box. In the form shown the six resistance coils taking the smallest current have one end connected to the bus-bar 28 and the six coils taking the largest current are connected at one end to the bus-bar 29. The other ends of the resistance coils are connected by individual leads 31 with contact fingers 32 arranged radially on the inside of the cover. The resistance coils are of approximately zero temperature coefficient and are protected by a ventilated shell 33 fastened to the insulating block at the top of the box.

In the cover of the box is a rotatory switch 34 made of insulating material with a handle 35 on the outside for turning it and a conducting segment 36 on the inside for connecting the several contact fingers 32.

Bearing upon the center of the segment is a spring conductor 37 that is connected with the binding post 38 on the outside of the cover. The current lead 39 from the standard meter 40 is designed to be fastened to this binding post, the other current lead 41 of the standard being connected to the current coil of the meter.

On the face of the switch and movable with it is an index mark 42 which is designed to register with the numerals arranged on the cover and encircling the switch that indicate the loads for the different positions of the switch. In this particular instance these numerals read from zero to 35 amperes as follows: .1, .2, .5, 1, 2, 5, 7.5, 10, 15, 20, 25, 35. When the switch is turned to one position, that is, when the index mark indicates zero the sector in the interior is not in contact with any of the fingers that are connected with the resistances. By turning the switch from point to point the various fingers are connected by means of the sector, and in doing this the resistances are in sequence connected in the circuit so as to permit the desired flow of current. By means of the segment on the inside of the switch the resistances are connected in circuit in multiple but with cumulative capacity, the resistances being proportioned in the apparatus illustrated so that when the first is connected .1 of an ampere will flow; when put to use and the next finger is connected .2 will flow; when the next finger is connected .5 will flow; when the next finger is connected 1 ampere will flow, and so on up to 35 amperes. As stated, the first six steps are at a pressure of 10 volts and the last six steps at a pressure of 5 volts, for as the ampere rating of meters to be tested increases the pressure may be lowered because the impedance in the coils of large meters is less than the impedance in the coils of small meters. The resistance coils, when the switch is rotated, are connected one after the other so that the amounts of current flow are cumulative, and as the load steps are adjusted at each point to a given length and size of lead the steps are very reliable and are not subject to variation by drop in the transformer. Therefore it is possible to use a very light transformer with attendant reduction in size and weight of the entire apparatus, and at the same time insure great accuracy in the tests.

The invention claimed is;

1. A portable load box for meter testing having means for the attachment of current and potential leads, a low voltage transformer for supplying current, a plural number of conducting contacts, a plural number of constant resistance coils connected in multiple between the secondary winding of the transformer and said contacts, said resistances being so calibrated that each when connected with the others in sequence will increase the current flow to the desired unitary amount, and a single manually operated switch arranged to electrically connect said contacts together sequentially and accumulate the currents which will flow through the several resistances.

2. A portable load box for meter testing having means for the attachment of current and potential leads, a low voltage transformer, a plural number of constant resistance coils connected in multiple to the secondary winding of the transformer at a point to obtain current at one voltage, a plural number of constant resistance coils connected in multiple to the secondary winding of the transformer at a point to obtain current at a different voltage, a plural number of conducting contacts electrically connected with the resistance coils, and a single manually operated switch arranged to electrically connect said contacts together sequentially and accumulate the currents which will flow through the several resistances.

HENRY J. BLAKESLEE.

Copies of this patent may be obtained for five cents each, by addressing the "Commissioner of Patents, Washington, D. C."